United States Patent [19]

Kellis

[11] Patent Number: 5,642,804
[45] Date of Patent: Jul. 1, 1997

[54] PULLEY BRAKE

[75] Inventor: John K. Kellis, Winfield, Ala.

[73] Assignee: Continental Conveyor & Equipment Co., L.P., Winfield, Ala.

[21] Appl. No.: 685,166

[22] Filed: Jul. 23, 1996

[51] Int. Cl.⁶ .................................................. B65G 23/00
[52] U.S. Cl. ........................................................ 198/832.2
[58] Field of Search .................................. 198/832.2, 835

[56] References Cited

U.S. PATENT DOCUMENTS

| | | | |
|---|---|---|---|
| 2,421,056 | 5/1947 | Dake et al. | 198/832.2 |
| 3,122,945 | 3/1964 | Chung . | |
| 3,470,992 | 10/1969 | Lagemann . | |
| 3,511,350 | 5/1970 | Vom Stein . | |
| 3,557,925 | 1/1971 | Zulauf . | |
| 4,013,166 | 3/1977 | Weady et al. . | |
| 4,047,452 | 9/1977 | Eddy . | |
| 4,082,180 | 4/1978 | Chung . . | |
| 4,168,611 | 9/1979 | Woyton et al. . | |
| 4,223,775 | 9/1980 | Lloyd . | |
| 4,548,316 | 10/1985 | Maurer | 198/832.2 |
| 4,588,065 | 5/1986 | Maiden et al. . | |
| 4,821,873 | 4/1989 | Crane . | |
| 5,147,020 | 9/1992 | Scherman et al. . | |

*Primary Examiner*—James R. Bidwell
*Attorney, Agent, or Firm*—Pearne, Gordon, McCoy & Granger LLP

[57] ABSTRACT

An improved braked pulley assembly for an endless conveyor including a pulley body, a pair of gearboxes, and a pair of hydraulic braking members. The gearboxes have bodies affixed to relatively opposite ends of the pulley body and rotate with the pulley body. The hydraulic braking members are laterally adjacent the pulley body and include an output shaft which is mechanically coupled to an input shaft of an associated gearbox. Actuation of the braking members transfers braking forces to the gearbox inputs and to the pulley body to permit controlled slowing of the pulley body rotational speed and, hence, a conveyor mounted thereon. The braked pulley assembly is specially adapted for use in conveyor assemblies which have limited available area for braking mechanisms, and which will not accommodate conventional disc brake/caliper assemblies.

14 Claims, 3 Drawing Sheets

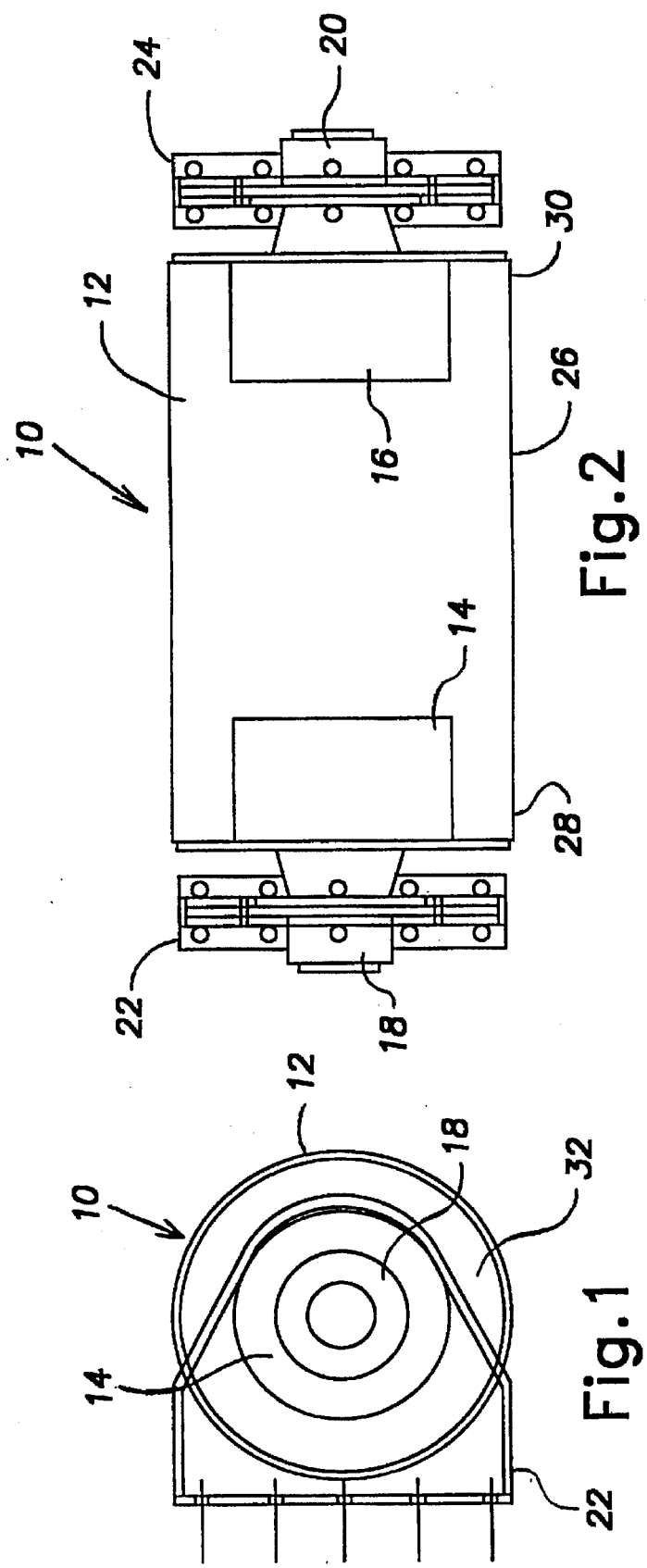

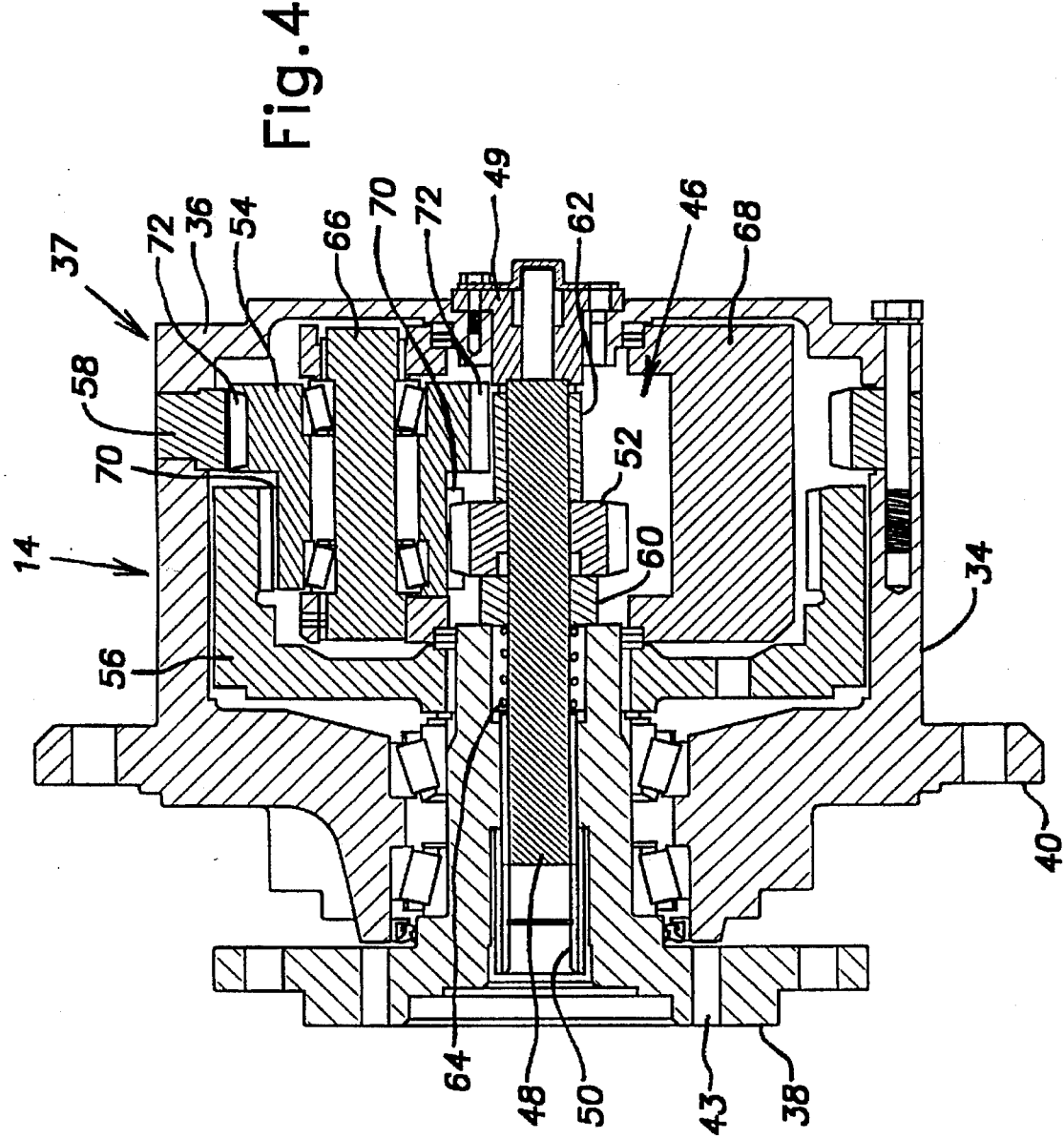

PULLEY BRAKE

BACKGROUND OF THE INVENTION

1. Field of the Invention

The present invention generally relates to pulleys and, more particularly, to braked pulleys used in endless conveyors.

2. Description of Related Art

Braked pulleys are used on endless conveyors to help bring the conveyor to a stop. Braked pulleys are conventionally used on most mining conveyors, such as fixed conveyors and mobile or long-run conveyors, and are necessary on down-hill conveyors. Such braked pulleys conventionally provide a pulley body which is mounted upon a pulley shaft, the pulley body and pulley shaft being joined at ends of the pulley body to force the pulley body to rotate with the pulley shaft. Ends of the pulley shaft project from the pulley body, each end having a brake disc mounted thereon. The brake disc is selectively engaged by brake pads mounted to spring or hydraulically actuated brake calipers and, as such, the overall design of braking assemblies used on conventional endless conveyor braked pulleys generally conforms with the design of disc brakes commonly used in automotive applications.

Such conventional braked pulleys have the braking mechanism exposed to dirty and harsh environments, which tends to limit the useful life of the brake components. Moreover, in applications wherein the conveyor is to be stopped repeatedly, heat generated from frictional engagement between the brake pads and the brake disk has, in the past, caused the braking mechanism to over-heat and fail. As such, regular replacement in high-use applications is common.

The aforementioned conventional braking systems also suffer from structural disadvantages which render their use less than desirable, and has, in some applications, rendered their use impossible. For example, in some fixed conveyor applications, there is limited available space at each end of the conveyor pulley. The conventional design requires the brake discs/calipers to be laterally outboard of the pulley body. As such, inclusion of the aforementioned conventional braking system on some fixed conveyor installations has been problematic, and has resulted in less than optimal installations.

Furthermore, in mobile conveyors, there is not enough space laterally outboard of the pulley body to accommodate the brake discs/calipers. Moreover, in mobile conveyors the conveyor must be stopped often to permit advance/retreat of the conveyor, and the conventional braking system tends to overheat upon repeated use and, therefore, is ill-suited to repeatedly stop the conveyor, as discussed previously. As such, the aforementioned conventional braked pulleys and pulley braking systems are not practically useful in such applications.

Therefore, there exists a need in the art for a braked pulley and a braked pulley system which is dimensionally smaller, and which does not occupy a significant amount of space laterally of the pulley body. There also exists a need in the art for a braked pulley which is useful in installations wherein spacial constraints prevent large exterior braking assemblies from being used. There also exists a need in the art for a braked pulley which is adapted for the harsh and dirty conditions of a mine, and which is adapted for repeated use without overheating.

SUMMARY OF THE INVENTION

The present invention is directed toward a braked pulley which is of reduced size and toward a pulley braking system which is useful on endless conveyors which will otherwise not accommodate a braked pulley due to spacial constrains. The present invention is also directed toward a braked pulley which can be repeatedly used without overheating, and wherein the braking elements are sealed or enclosed, and are not degraded or damaged by contamination in dirty environments.

In accordance with the present invention, a braked pulley assembly for an endless conveyor includes a pulley body, a gearbox, and a hydraulic brake. The pulley body is generally hollow and cylindrical in shape and has the gearbox mounted within the hollow interior thereof. The gearbox has an input shaft and a body. The gearbox body is concentric with the pulley body and is secured to the pulley body for common rotation therewith. The gearbox body is operably interconnected to the input shaft such that rotation of the input shaft is communicated to the gearbox body and the pulley.

In further accordance with the present invention, the brake is located laterally adjacent the pulley body and has an output shaft which is aligned and mechanically coupled to the gearbox input shaft for mutual rotation about a common axis. The brake is operated in either an actuated, non-braking mode or an at-rest, braking mode.

In further accordance with the present invention, switching of the hydraulic brake from the actuated to the non-actuated modes of operation decreases a rotational speed of the brake output shaft and the gearbox input shaft and causes a rotational speed of the gearbox and the pulley body to decrease.

BRIEF DESCRIPTION OF THE DRAWINGS

These and further features of the present invention will be apparent with reference to the following description and drawings, wherein:

FIG. 1 is a schematic end elevational view of a pulley assembly according to the present invention;

FIG. 2 is a schematic top plan view of a pulley assembly according to the present invention;

FIG. 4 is a cross-sectional view of a gear box according to the present invention.

DETAILED DESCRIPTION OF THE PREFERRED EMBODIMENT

Figure 3:
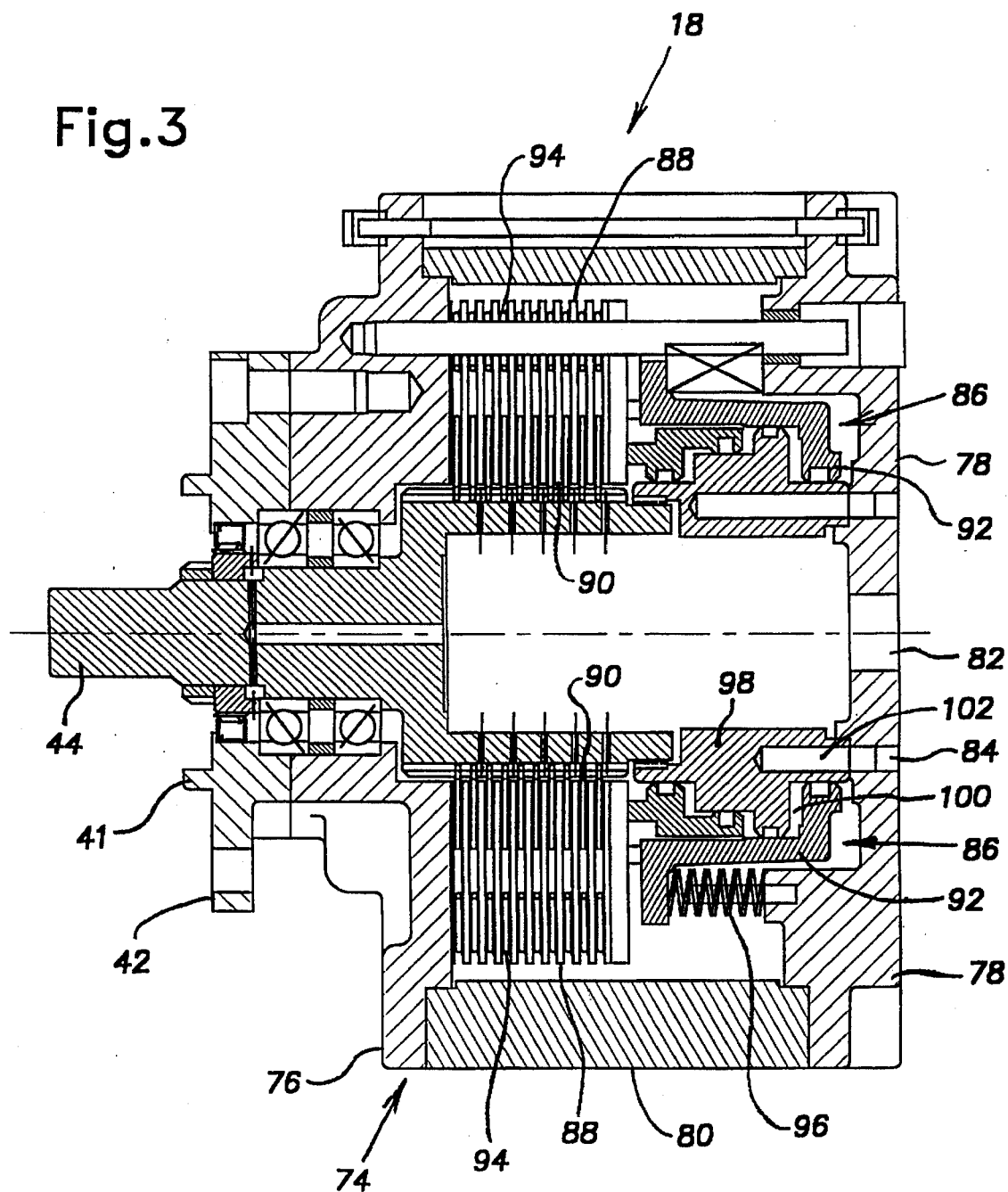
FIG. 3 is a cross-sectional view of a hydraulic brake according to the present invention.

With reference to the drawing figures and, in particular, FIG. 1, a braked pulley assembly 10 according to the present invention is illustrated. The braked pulley assembly 10 includes a pulley body 12, first and second gearboxes 14, 16, first and second hydraulic brake assemblies 18, 20, and first and second mounting brackets 22, 24. As will be apparent from the discussion to follow, the preferred and illustrated braked pulley assembly 10 according to the present invention is adapted for use at a tail portion of an endless conveyor assembly, preferably in conjunction with a mobile or advancing conveyor incorporating a conveyor belt accumulator assembly. Such a conveyor must be periodically stopped to permit advancement or retreat of the operating length of the conveyor as is necessary during a continuous mining/conveying operation.

The pulley body 12 is generally cylindrical and hollow, and has an outer surface 26 over which a conveyor belt (not shown) moves. The pulley body has first and second ends 28, 30 in which the first and second gearboxes 14, 16 are disposed, respectively. The first and second ends 28, 30 each include an annular rim 32 which is secured to an associated gearbox 14, 16 such that the gearboxes and pulley body 10 are rotationally linked, as will be described more fully hereafter.

With reference to FIG. 4, the first gearbox 14 is illustrated, it being understood that the second gearbox 16 is preferably identical thereto. The first gearbox 14 has a hub spindle member 34, a cover member 36, and a mounting adapter member 38. The cover member 36 is secured, preferably by bolts, to the spindle member 34, and cooperates with the spindle member 34 to define a hollow body 37 of the gearbox 14.

The spindle member 34 has a radial mounting flange 40 which is affixed to the annular rim 32 provided at the associated first end 28 of the pulley body 12. Preferably, the gearbox mounting flange 40 is bolted to the pulley body annular rim 32 and thereby rotates coaxially and at a common speed with the pulley body 12. An end of the gear box 14 opposite the cover member 36 is closed by the mounting adapter member 38 which is secured to a mounting bracket 22 (FIGS. 1 and 2) and through which an output shaft 44 of the first hydraulic brake assembly 18 extends.

Disposed within the gearbox hollow body 37 is a differential planetary wheel drive assembly 46 which transfers braking forces from the brake assembly 18 to the gearbox body 37, the pulley body 12, and the conveyor belt mounted thereover. The planetary wheel drive assembly 46 includes an input shaft 48, a coupling member 50 which couples the input shaft 48 to the brake assembly output shaft 44 for mutual rotation, an input pinion gear 52 secured to the input shaft 48, a differential gear 54, an internal gear 56, and a ring gear 58 secured to the gearbox body 37.

The input shaft 48 extends from the mounting adapter member 38 into the interior of the gearbox 14 and toward the cover member 36. A first end of the input shaft 48 is secured to the coupling member 50 disposed within a recess in the mounting adapter member 38. An opposite or second end of the input shaft 48 is rotationally journalled to the cover member 36 by a bearing member 49, as illustrated.

Intermediate the first and second ends of the input shaft 48, the input pinion gear 52 is affixed over the input shaft. First and second thrust spacers 60, 62 are disposed over the shaft 48 on laterally opposite sides of the input pinion gear 52. The first thrust spacer 60 is engaged by a spring 64 which is disposed around the input shaft 48 and received within an enlarged recess provided at an inner end of the mounting adapter member 38.

The input pinion gear 52 is coupled to the differential gear 54. The differential gear 54 is mounted upon a shaft 66 which is secured within the hollow body by a carrier assembly 68. Bearings are provided between the differential gear 54 and the shaft 66, as illustrated. The differential gear 54 includes a first smaller diameter portion 70 coupled to the input pinion gear 52 and the internal gear 56, and a second, larger diameter portion 72 coupled to the ring gear 58. The ring gear 58 is secured to the gearbox body intermediate the hub spindle assembly 34 and the cover member 36. As such, the gearbox body 37 and ring gear 58 are affixed to one another for mutual rotation about an axis defined by the input shaft 48.

With reference to FIG. 3, the first hydraulic brake assembly 18 is illustrated, it being understood that the second hydraulic brake assembly 20 is identical thereto. The first hydraulic brake assembly 18 includes a housing 74 which defines a hollow chamber in which a wet-disk type brake is disposed. The brake assembly housing 74 includes first and second end caps 76, 78, the mounting adapter 42 and a cylindrical main body portion 80 intermediate the first and second end caps 76, 78. The end caps 76, 78, mounting adapter 42 and main body portion 80 are preferably bolted together to form a unitary assembly. The brake assembly mounting adapter 42 is preferably secured to the gearbox mounting adapter 38 by bolts and cooperation of aligned annular projections 41 and grooves 43, as illustrated.

The second end cap 78 includes a coolant inlet port 82 and at least one hydraulic actuation fluid inlet port 84. Cooling fluid is introduced into the hollow chamber of the housing 74 via the coolant inlet port 82 and exits the housing 74 from a radial coolant outlet port (not shown). Pressurized hydraulic fluid is introduced via the actuation fluid inlet ports 84 into a brake actuator assembly 86, as will be described more fully hereafter.

Partially disposed within the hollow chamber defined by the housing 74 is the output shaft 44, which projects through the second end cap 78 and the mounting adapter 42, a plurality of drive plates 88, a plurality of friction discs 90, and the brake actuator assembly 86. The output shaft 44 has a hollow, perforated inner end disposed within the hollow chamber.

The friction discs 90 are annular members affixed to and radially projecting from the inner end of the output shaft 44, as illustrated. The drive plates 88 are annular members interleaved or interposed between adjacent friction discs 90. Perforations or holes provided through the inner end of the output shaft 44 permit cooling fluid to circulate through the housing interior, including around the drive plates 88 and friction discs 90. A cooling fluid outlet (not shown) is preferably provided at a radial surface of the housing 74.

The drive plates 88 are connected to a generally cylindrically-shaped piston member 92 provided by the brake actuator assembly 86, and move into and out of engagement with the friction discs 90 upon corresponding movement of the piston member 92, as will be described more fully hereafter. Separator springs 94 are disposed between adjacent drive plates, and maintain the drive plates 88 a distance from one another.

The brake actuator assembly 86 includes, in addition to the piston member 92, a plurality of biasing springs 96, and an annular member 98. The annular member 98 is concentric with the piston member 92 and cooperates with the cylindrical piston member 92 to define an actuation chamber 100. Passages 102, corresponding in number to the number of actuation fluid inlet port(s) 84, are formed through the annular member 98 to communicate pressurized fluid from the inlet port(s) 84 to the actuation chamber 100. The biasing springs 96 urge the piston member 92 toward a normal or at-rest position in which the drive plates 88 engage the friction discs 90. The piston member 92 is moved to an actuated position in which the drive plates 88 are disengaged from the friction discs 90 by pressurized actuation fluid introduced into the actuation chamber 100 via the inlet port(s) 84 and passage(s) 102.

When pressurized actuation fluid is introduced into the actuation chamber 100, the piston member 92 and drive plates 88 are moved against the spring bias, and the drive plates 88 are moved out of engagement with the friction discs 90. When pressurizing fluid is discontinued or cut off to the actuation chamber 100, the spring 96 returns the piston member 92 to the at-rest position wherein the drive plates 88 engage the friction discs 90. Frictional engagement between the drive plates 88 and the friction discs 90 quickly slows and stops rotation of the brake output shaft 44, the gearbox input shaft 48 connected thereto, and the pulley 12 secured to the gearbox, and the conveyor belt.

The arrangement wherein discontinuation of pressurized fluid brings about stopping of the pulley is preferred insofar as the pulley body 12 and conveyor belt will be stopped should a power or system component failure occur, i.e., pump failure, power outage, rupturing of a hydraulic line. Naturally, it is contemplated that the arrangement could be reversed such that the at-rest or normal position of the piston member is disengaged (no braking) and the actuated position is engaged (braking).

The braking surfaces (i.e., drive plates 88 and friction discs 90) are completely enclosed and isolated from the surrounding environment, and therefore are not damaged by dirt or other environmental conditions. The continuous flow of cooling fluid keeps the brake assemblies 18, 20 cool, and prevents overheating thereof. The assembly 10 is dimensionally small, and therefore adapted for use in conveyor assemblies, such as mobile conveyors, wherein space is at a premium. Moreover, the assembly 10 is adapted for repeated use, and quickly slows an associated conveyor belt from an operating speed to a complete stop.

While the preferred embodiment of the present invention is shown and described herein, it is to be understood that the same is not so limited but shall cover and include any and all modifications thereof which fall within the purview of the invention. For example, in a down-hill type endless conveyor wherein the conveyed material and the conveyor belt develop significant inertia resisting stopping, a plurality of braked pulley assemblies according to the present invention may be used.

What is claimed is:

1. A braked pulley assembly for an endless conveyor, comprising:

a pulley body, said pulley body being generally hollow and cylindrical in shape;

a gearbox mounted within the hollow interior of the pulley body, said gearbox having an input shaft and a body, said gearbox body being concentric with said pulley body and secured to said pulley body for common rotation therewith, said gearbox body being operably interconnected to said input shaft such that rotation of said input shaft is communicated to said gearbox body and said pulley;

a hydraulic brake mounted laterally adjacent said pulley body and having an output shaft, said output shaft being aligned with said input shaft and being mechanically coupled to said gearbox input shaft for mutual rotation about a common axis, said hydraulic brake being operable in either an actuated, non-braking mode or an at-rest, braking mode;

wherein switching of said hydraulic brake from said actuated to said non-actuated modes of operation decreases a rotational speed of said brake output shaft and causes a rotational speed of the gearbox and the pulley body to decrease.

2. A pulley brake assembly according to claim 1, wherein the gear box input shaft and output shaft are rotationally coupled and rotate at a first speed, and wherein said gearbox body and pulley body rotate at a second speed which is different than said first speed.

3. A pulley brake assembly according to claim 2, wherein the second speed is proportional to, but slower than, the rotational speed of the output shafts.

4. A pulley brake assembly according to claim 2, wherein said input shaft is connected to said gearbox body by a differential gear drive assembly.

5. A pulley brake assembly according to claim 4, wherein said differential gear drive assembly includes an input pinion secured to the input shaft, a differential gear, and a ring gear, said differential gear having a first portion coupled to the input pinion and a second portion coupled to the ring gear.

6. A pulley brake assembly according to claim 5, wherein the ring gear is secured to the gear box body for mutual rotation.

7. A pulley brake assembly according to claim 6, wherein said first portion has a first diameter and said second portion has a second diameter, said first diameter being smaller than said second diameter.

8. A braked pulley assembly for an endless conveyor, comprising:

a pulley body, said pulley body having first and second ends;

a first gearbox mounted within said first end of said pulley body, said first gearbox having an input shaft and a body, said first gearbox being generally concentric with said pulley body and secured to said pulley body first end for common rotation therewith, said first gearbox body being operably interconnected to said first gearbox input shaft such that rotation of said first gearbox input shaft is communicated to said first gearbox body and said pulley;

a second gearbox mounted within said second end of said pulley body, said second gearbox having an input shaft and a body, said second gearbox being generally concentric with said pulley body and secured to said pulley body second end for common rotation therewith, said second gearbox body being operably interconnected to said second gearbox input shaft such that rotation of said second gearbox input shaft is communicated to said second gearbox body and said pulley;

a first hydraulic brake mounted adjacent said pulley body and having an output shaft, said first brake output shaft being aligned with said first gearbox input shaft and laterally spaced from said first end of said pulley body, said first brake output shaft being mechanically coupled to said first gearbox input shaft for rotation about a common axis, said first hydraulic brake being operable in either an actuated, non-braking mode or an at-rest, braking mode;

a second hydraulic brake mounted adjacent said pulley body and having an output shaft, said second brake output shaft being aligned with said second gearbox input shaft and laterally spaced from said second end of said pulley body, said second brake output shaft being mechanically coupled to said second gearbox input shaft for rotation about a common axis, said second hydraulic brake being operable in either an actuated, non-braking mode or an at-rest, braking mode;

wherein switching of said first and second hydraulic brakes from said actuated to said non-actuated modes of operation decreases a rotational speed of said first and second brake output shafts and causes a rotational speed of the first and second gearbox bodies and the pulley body to decrease.

9. A pulley brake assembly according to claim 8, wherein the first gearbox input shaft and said first brake output shaft are rotationally coupled to one another and rotate at a first speed, said second gearbox input shaft and said second brake output shaft are rotationally coupled to one another and rotate at said first speed, and wherein said first and second gearbox bodies and said pulley body rotate at a second speed which is different than said first speed.

10. A pulley brake assembly according to claim 9, wherein the second speed is proportional to, but slower than, the first speed.

11. A pulley brake assembly according to claim 9, wherein each gearbox input shaft is connected to an associated gearbox body by a differential gear drive assembly.

12. A pulley brake assembly according to claim 11, wherein said differential gear drive assembly includes an input pinion secured to the input shaft, a differential gear, and a ring gear, said differential gear having a first portion coupled to the input pinion and a second portion coupled to the ring gear.

13. A pulley brake assembly according to claim 12, wherein each ring gear is secured to an associated gearbox body for mutual rotation.

14. A pulley brake assembly according to claim 13, wherein said first portion has a first diameter and said second portion has a second diameter, said first diameter being smaller than said second diameter.

* * * * *